United States Patent
Lee et al.

(10) Patent No.: US 12,390,977 B2
(45) Date of Patent: Aug. 19, 2025

(54) METHOD OF FLUID FORMING AND FILLING CONTAINERS

(71) Applicant: Discma AG, Hünenberg (CH)

(72) Inventors: Darrel Lee, Saline, MI (US); Richard Sieradzki, Novi, MI (US)

(73) Assignee: DISCMA AG, Hünenberg (CH)

( * ) Notice: Subject to any disclaimer, the term of this patent is extended or adjusted under 35 U.S.C. 154(b) by 242 days.

(21) Appl. No.: 18/001,630

(22) PCT Filed: Jun. 19, 2020

(86) PCT No.: PCT/IB2020/055796
§ 371 (c)(1),
(2) Date: Dec. 13, 2022

(87) PCT Pub. No.: WO2021/255504
PCT Pub. Date: Dec. 23, 2021

(65) Prior Publication Data
US 2023/0219277 A1   Jul. 13, 2023

(51) Int. Cl.
*B29C 49/42* (2006.01)
*B29C 49/46* (2006.01)
*B29K 67/00* (2006.01)
*B29L 31/00* (2006.01)

(52) U.S. Cl.
CPC ........ *B29C 49/46* (2013.01); *B29C 49/42808* (2022.05); *B29C 2049/4664* (2013.01); *B29C 2949/0715* (2022.05); *B29K 2067/003* (2013.01); *B29L 2031/7158* (2013.01)

(58) Field of Classification Search
CPC .......... B29C 49/4273; B29C 49/42808; B29C 49/46; B29C 49/4283; B29C 2049/4664; B29C 2949/0715; B29C 49/06; B29C 49/42832; B29L 2031/7158
See application file for complete search history.

(56) References Cited

U.S. PATENT DOCUMENTS

| | | | |
|---|---|---|---|
| 8,727,758 B2 | 5/2014 | Eberle et al. | |
| 9,802,375 B2 | 10/2017 | Lisch et al. | |
| 2017/0021553 A1 | 1/2017 | Kharchenko et al. | |
| 2019/0232545 A1 | 8/2019 | Tabata et al. | |
| 2019/0240891 A1 | 8/2019 | Ishii | |

FOREIGN PATENT DOCUMENTS

| | | |
|---|---|---|
| CN | 104010792 A | 8/2014 |
| CN | 109070432 A | 12/2018 |
| WO | 2012037057 A | 3/2012 |

*Primary Examiner* — Monica A Huson
(74) *Attorney, Agent, or Firm* — Michael E. Dockins; Shumaker, Loop & Kendrick, LLP

(57) ABSTRACT

Ways for controlling a level of a product in a container are provided that include engaging an exterior surface of the container containing the product at a first product level. A force is applied to the exterior surface of the container to cause the container to change from a first volume to a second volume. Cessation of the force results in the container containing the product at a second product level. The second product level can provide an accurate and reproducible final product level in the container.

18 Claims, 7 Drawing Sheets

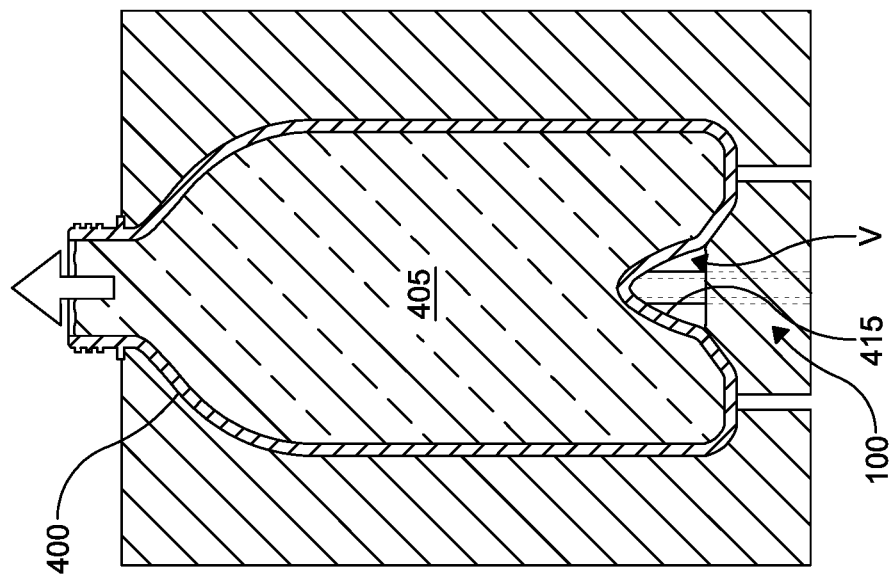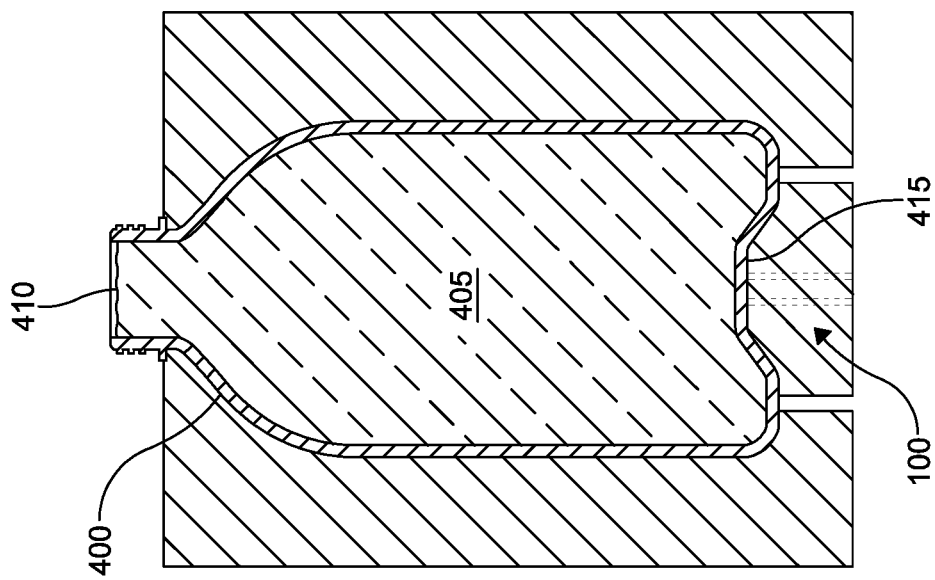

METHOD OF FLUID FORMING AND FILLING CONTAINERS

FIELD

The present technology relates to simultaneously forming and filling a container, including controlling a final product level in the container.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding and extrusion blow molding.

Injection blow molding can be used to form certain plastic containers in one or more stages and can involve use of a stretch rod. In a two-stage injection stretch blow molding process, the plastic is first molded into a preform using an injection molding process. The preform includes the neck and finish of the container to be formed, which can include threading thereon, and a closed distal end. The preform can then be heated above the plastic glass transition temperature, longitudinally stretched with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold. The injection stretch blow molding process can be used to form plastic containers for packaging consumer beverages, as well as other liquids and materials. However, the process has some inherent limitations, which include undesirable gate wells or discontinuities on the bottom portions of containers as well as limitations on the possible spectrum of designs that can be realized using the stretch blow molding process, such as containers incorporating a handle or void space therein.

Extrusion blow molding can be used to form certain plastic containers where a continuously extruded hot plastic tube or parison is captured within a mold and inflated against the inner surfaces of the mold to form a container blank. The mold can be designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion. While extrusion blow molding processes have addressed a need for an improved plastic container that obviates some of the disadvantages inherent to containers fabricated using the stretch blow molding process, the extrusion blow molding processing requires a number of steps to form the container then later fill and cap the container. As a result, significant costs can be incurred while separately performing the container forming and filling processes, including transport and time commitments.

Blow molding containers and subsequent filling of containers have consequently developed as two independent processes, in many cases operated at different facilities. In order to make container filling more cost effective, some filling facilities have installed blow molding equipment on site, in many cases integrating blow molders directly into filling lines. Equipment manufacturers have recognized this advantage and are selling "integrated" systems that are designed to insure that the blow molder and the filler are fully synchronized. Despite the efforts in bringing the two processes together, blow molding and filling continue to be two independent, distinct processes. As a result, significant costs may be incurred in separately performing these two processes.

In response to the separate blow molding and filling processes, certain liquid or hydraulic blow molding systems have arisen that form and fill a container in a single operation. The liquid product used to form and fill the preform into the resultant container can thereafter remain the finished container. Combination of the forming and filling steps can therefore optimize packaging of a liquid product by eliminating the transport of empty bottles and time demands related to subsequent filling operations.

Certain obstacles exist in forming and filling containers with certain products, however. In particular, simultaneous forming and filling operations using a product, where the product remains in the resultant container, can present issues in accurately obtaining a desired product level in the resultant container. The desired product level can often be less than the maximum volume of the container, where an air or gas space is maintained above a defined product or liquid level for various reasons. Example reasons include where the air space permits expansion/contraction in response to temperature changes without exerting substantial pressure changes on the container itself, where the air space provides a uniform aesthetic to the filled, finished and capped container, where the accurate fill level is used to identify a definite amount of product within the container, where the air space facilitates mixing of the container contents by inversion or shaking of the container when sealed, where the air space permits addition of additional material, whether solid or liquid, to the product within the container, and so on. There is accordingly a need to control a final product level in a container, including a container formed and filled with the product.

SUMMARY

The present technology includes systems, processes, and articles of manufacture that relate to control and adjustment of a product level in a container, including where the container formed and filled from a preform using the product, the product remaining in the container as an end product.

Ways are provided for controlling a level of a product in a container that include engaging an exterior surface of the container containing the product, where the product is at a first product level. A force can be applied to the exterior surface of the container to cause the container to change from a first volume to a second volume. Cessation of the force results in the container containing the product at a second product level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2C illustrate a series of schematic side views depicting an exterior rod adjusting a final product level in a filled container formed according to the container forming process shown in FIGS. 1A-1F.

Corresponding reference numerals indicate corresponding parts throughout the several views of the drawings.

DETAILED DESCRIPTION

Figure 1A:
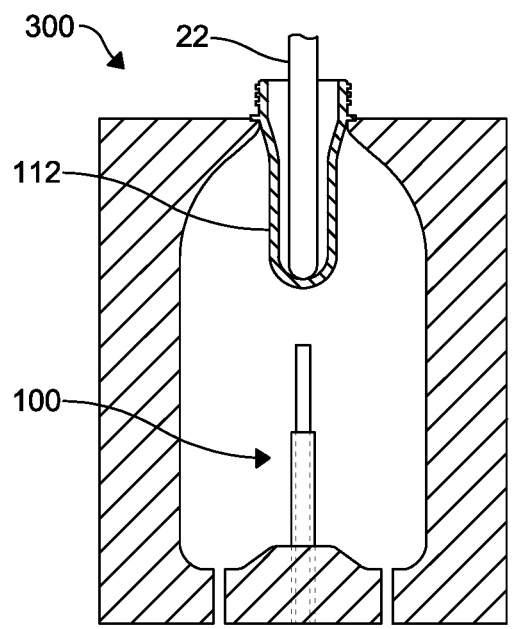
FIGS. 1A-1F illustrate a series of schematic side views depicting an exterior rod guiding a preform during a container forming process.
Figure 1B:
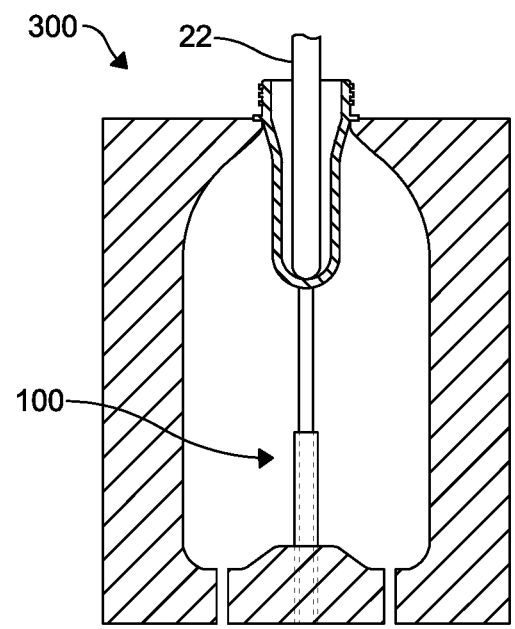
Figure 1C:
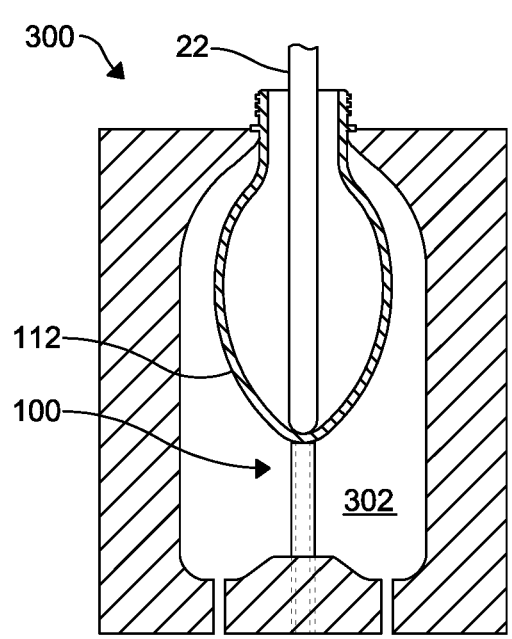
Figure 1D:
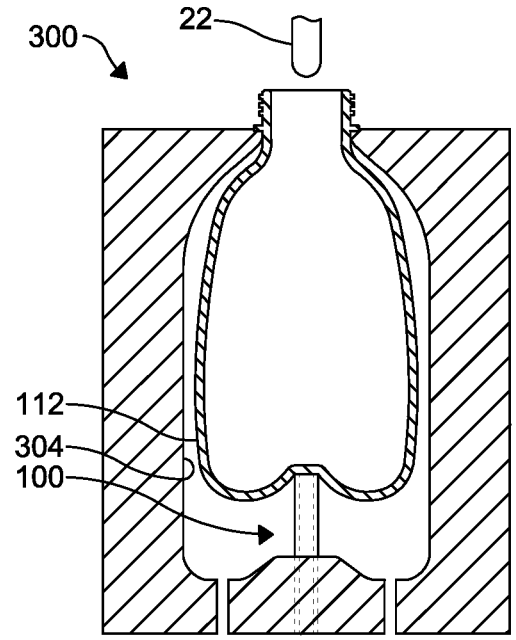
Figure 1E:
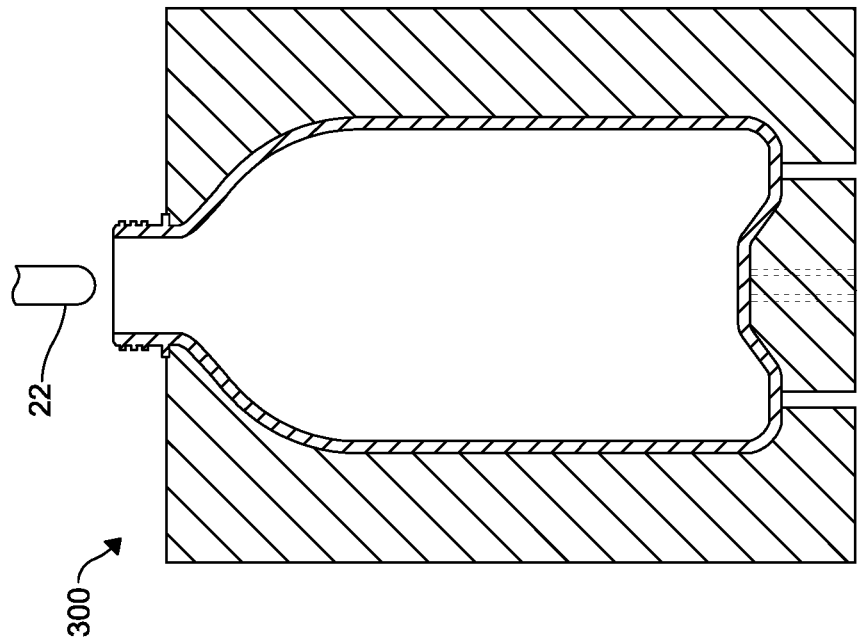
Figure 1F:
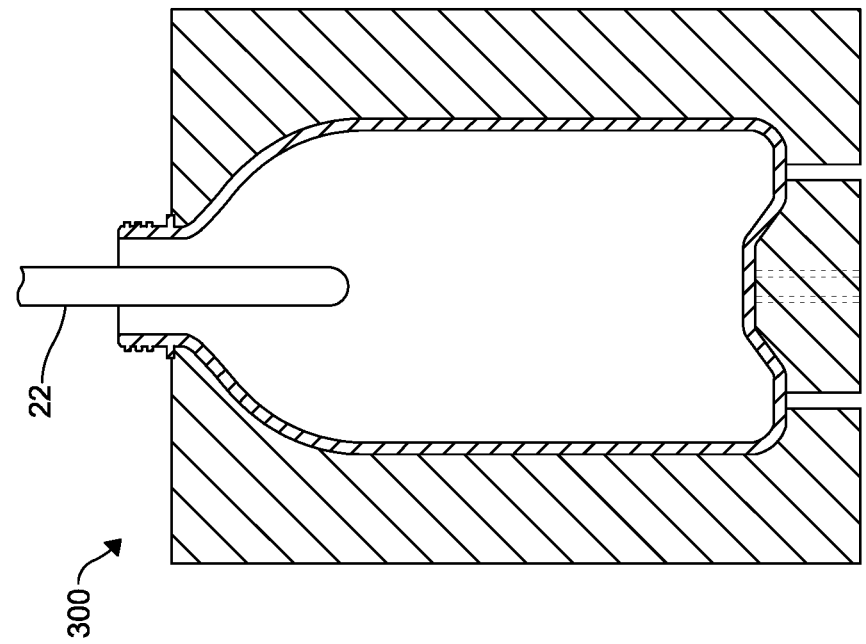

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology allows for controlling a level of a product in a container, where the container can be formed and filled using the product. Product level can be controlled by engaging an exterior surface of the container containing the product, where the product is at a first product level. Applying a force to the exterior surface of the container can then cause the container to change from a first volume to a second volume. Cessation of the force can result in the container containing the product at a second product level.

Various aspects can apply to product levels within the container and/or relationships to volumes of the container. The first product level can relate to an amount of product substantially equal to the first volume. It is also possible to have the second product level relate to an amount of product substantially equal to the second volume. Various relationships include where the first volume can be greater than the second volume and in other embodiments the first volume can be less than the second volume.

Certain embodiments include where the container substantially returns to the first volume following cessation of the force. For example, after engaging the exterior surface of the container, a force can be applied by pushing on the exterior surface of the container. Pushing the exterior surface can reduce the volume of the container and can cause product to exit the container. Where the second volume is less than the volume of product in the container, a portion of the product in the container can exit the container. Where the container was previously substantially full of product (e.g., the first product level was substantially at the top of the container), pushing on the exterior surface can result in a defined amount of product exiting the container in proportion to the volume change of the container. Various filling operations and various forming and filling operations that employ the product to form and fill the container can result in the container being substantially full of product. Engaging and applying the force to the exterior surface of such a filled container can result in overflow or controlled overflow and capture of product exiting from the container. Cessation of the force pushing on the exterior surface of the container can result in the container returning to the first volume, which is greater than the second volume in this case, thereby causing the product in the container (minus the portion that exited the container) to drop to the second product level in the container. For example, the container can resiliently or elastically return to a former shape upon cessation of the force.

Certain embodiments include where the container remains at the second volume following cessation of the force. For example, after engaging the exterior surface of the container, a force can be applied by pulling on the exterior surface of the container. Pulling on the exterior surface can increase the volume of the container and can cause the level of the product in the container to drop from the first product level to the second product level. Various filling operations and various forming and filling operations that employ the product to form and fill the container can result in the container being substantially full of product. Engaging and applying the force to the exterior surface of such a filled container can result in the second volume being greater than the first volume and the first product level dropping to the second product level. Cessation of the force pushing on the exterior surface of the container can result in the container substantially remaining at the second volume, being greater than the first volume in this case, thereby causing the product in the container to drop a defined amount to the second product level in the container. For example, the container wall can have formed therein a shape or recess that can be inverted or where at least a portion pops out and remains in such position following cessation of the force.

Containers used in the present technology can be formed in various ways and certain methods include using the product to simultaneously form and fill the container by expanding a preform within a mold. In particular, prior to applying a force to the exterior surface of the container to cause the container to change from a first volume to a second volume, the process can include dispensing the product into a preform to form and fill a container with the product. At least a portion of the preform can be positioned within a mold cavity that defines an internal surface and a blow nozzle can be used to transfer the product to the preform to urge the preform to expand toward the internal surface of the mold cavity and form the container. In such forming and filling operations, the product can remain within the container as an end product and the resultant container can be filled substantially to capacity with the product. It is also possible to mechanically stretch the preform within the mold cavity using a stretch rod. In conjunction with the stretch rod, it is also possible to have an exterior rod engage an exterior surface of the preform when the preform is being mechanically stretched within the mold cavity using the stretch rod.

Examples of using a stretch rod, an exterior rod, and a stretch rod in conjunction with an exterior rod in operating on a preform to form a container include those described in U.S. Pat. No. 8,727,758 to Eberle et al. and U.S. Pat. No. 9,802,375 to Lisch et al. and those described in Int'l Pub. No. WO/2012/037057A2 to Maki et al., where the entire contents of each are incorporated herein by reference.

Certain embodiments include employing the following aspects in engaging the exterior surface of the container containing the product at the first product level. Engaging the exterior surface of the container can include engaging an engagement feature on the exterior surface of the container. For example, the engagement feature can be an injection molded feature of a preform used to form the container. It is also possible to have the engagement feature include a projection on the exterior surface of the container. Various embodiments can have the projection result from a sprue in forming the container; e.g., a sprue resulting from injection molding the preform used to subsequently blow mold the container. The projection can also result from extrusion blow molding of the container; e.g., a portion of the extruded parison that is pinched or captured by a lower portion of a mold used to blow molding.

In embodiments where the engagement feature includes a projection, the projection can be located within a recessed portion of the exterior surface of the container. This recessed portion can exist prior to applying the force to the exterior surface of the container to cause the container to change from the first volume to the second volume. Pulling on the projection within the recessed portion, for example, can cause all or part of the recessed portion to expand and even invert or pop out from a remainder of the container. The recessed portion of the exterior surface of the container can change to a projecting portion of the exterior surface of the container following application of the force to the exterior surface of the container to cause the container to change from the first volume to the second volume. Embodiments therefore can include where it is possible to push against at least one of the engagement feature and the exterior surface of the container to cause the first volume to be reduced to the second volume (e.g., where the first volume is greater than the second volume), and conversely, where it is possible to pull on the projection to cause the first volume to be increased to the second volume (e.g., where the first volume is less than the second volume).

Certain embodiments include various post product level control steps. The container containing the product at the second product level can be sealed, for example, to preserve the accurate fill level and ensure uniformity of filled containers. One or more labels can be applied to the container. Containers can be packaged and palletized in certain ways or the container filled with product can be dispensed on-demand.

The present technology also includes various systems and system components having the features provided herein. Methods of using such systems and components for simultaneously forming and filling a container with a product are also contemplated by the present technology. Various articles of manufacture are provided by the present technology, including various products-by-process.

With reference to the several figures provided herewith, non-limiting aspects of various embodiments of the present technology are illustrated.

FIGS. 1A-1F illustrate a series of schematic side views depicting an exterior rod 100 guiding a preform 112 during a container forming process. A stretch rod 22 and exterior rod 100 can be actuated concurrently and independently to effect a predetermined stretch and/or forming process. In this way, exterior rod 100 can be actuated from the base of a mold cavity 302 and can be initially activated to physically touch or contact a preform 112 prior to blowing, or the exterior rod 100 can stop prior to contacting the preform 112; e.g., FIGS. 1A-1B. In certain embodiments, the exterior rod 100 can function up to about 20 mm from the preform 112; however, in some embodiments the exterior rod 100 can improve quality and can insure that a portion of the preform 112 engages the exterior rod 100 so that the preform is maintained in a desired position within mold cavity 302.

In certain embodiments, where additional length of exterior rod 100 may be required in order to contact preform 112 and/or where space limitations below mold 300 prevent use of a unitarily-formed exterior rod 100 having sufficient length to contact preform 112, a telescoping version of exterior rod 100 can be used. That is, in some embodiments, a telescoping exterior rod 100 can be employed having a first section 104 slidably received within a second section 108. It should be recognized, however, that additional telescoping sections can be used.

During the forming and filling process, the exterior rod 100 can engage preform 112 at any time prior to or immediately following initiation of the container inflation; however, if exterior rod 100 is intended to engage preform 112 prior to inflation, the preform 112 can be loaded and then the exterior rod 100 can be engaged or actuated. The stretch rod 22 can be actuated next, and can engage preform 112 along with the exterior rod 100. Once the preform 112 is engaged with the exterior rod 100, inflation of the preform 112 to the resultant container can begin. The preform 112 can be inflated with the use of high pressure air or liquid, or a first step of low pressure air or liquid that is followed by a second step of high pressure air or liquid. Preform 112 can begin to inflate away from the stretch rod 22, and the stretch rod 22 can remain in place, or retract from the inflating preform 22 as the container is formed. Once the fill cycle is complete and the container is fully formed, the stretch rod 22 can be set to the desired depth in the container such that once the seal pin is closed, a product fill level can be at or close to a desired height within the container. The exterior rod 100 can then be removed from the container, the nozzle raised, and the container removed from the mold, fully formed and filled, with the product remaining inside the container.

Figure 2C:
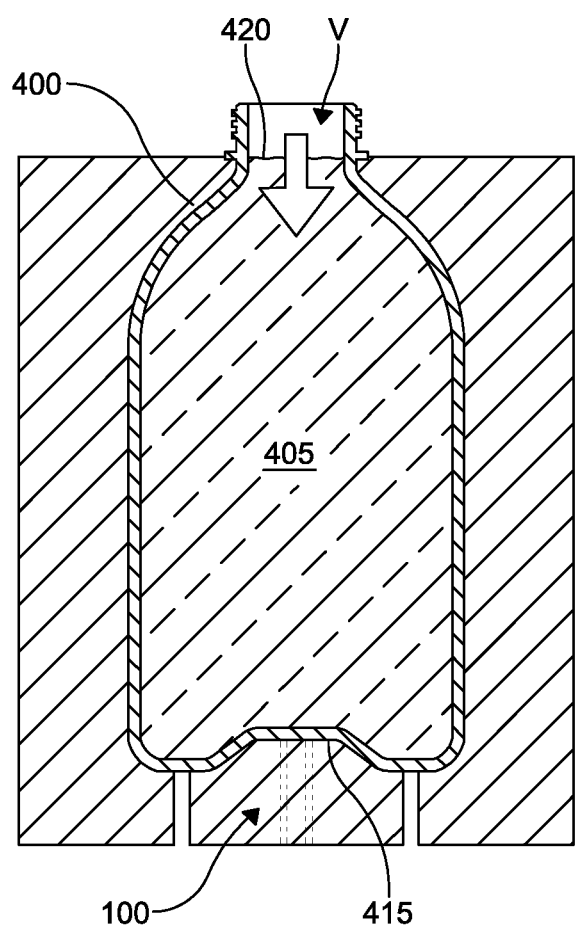

Turning now to FIGS. 2A-2C, illustrated therein is a series of schematic side views depicting an exterior rod adjusting a final product level in a filled container formed according to the container forming process shown in FIGS. 1A-1F. Shown in FIG. 2A is a container 200 that is filled with product 205 to substantially a capacity of the container 200. As can be seen, a fill level of the product 205, at substantially the capacity of the container 200, can account for a first product level 210 in this example. In FIG. 2B, an exterior surface 215 of the container 200 containing the product 205 at the first product level 210 can have a force applied thereto to cause the container 200 to change from a first volume to a second volume. The particular embodiment shown uses the exterior rod 100 to engage and apply the force to the exterior surface 215 of the container 200. Application of the force by pushing on the exterior surface 215 of the container 200 using the exterior rod 100 causes a deflection of the container 200 and a reduction in the volume of the container proportional to the deflected volume denoted by V in FIG. 2B. A corresponding amount of the product 205 to the deflected volume V exits the top of the container 200 as the product moves past the first product level 210 (limited by the capacity of the container 200), as indicated by the arrow located at the top of the container 200 in FIG. 2B. The product 205 exiting the container 200 as a result of the deflecting force applied by the exterior rod 100 can be directed away from the container 200 in some fashion and can even be captured and reused. As shown in FIG. 2C, cessation of the force results in the container 200 containing the product 205 at a second product level 220. The exterior rod 100 is retracted and no longer applying the force to the exterior surface 215 of the container 200 and the deflection (and deflected volume V) caused thereby is absent, where the container 200 has returned to substantially the same starting shape as shown in FIG. 2A. The first product level 210 has accordingly dropped to the second product level 220 in proportion to the deflected volume V in reference to the exited volume denoted by V in FIG. 2C.

Figure 3:
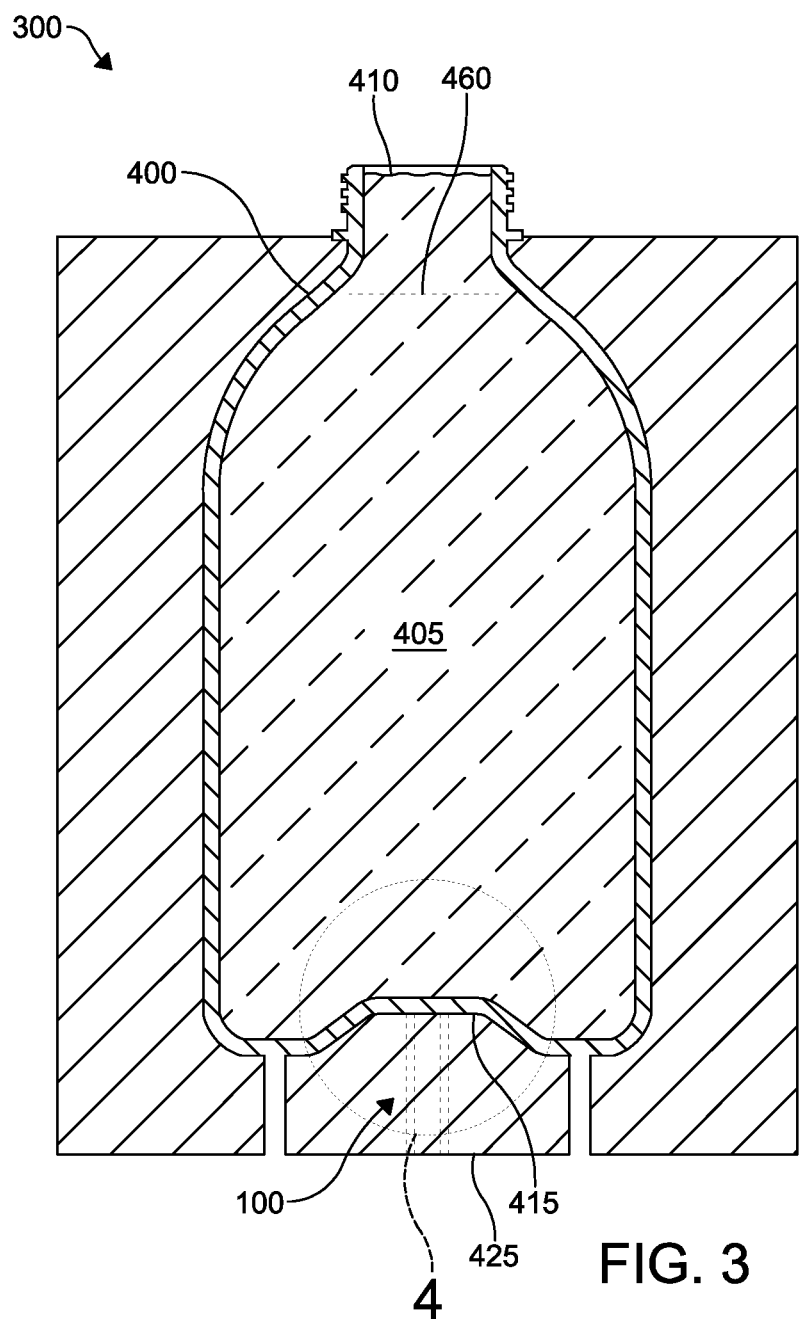
FIG. 3 illustrates a filled container formed according to the container forming process shown in FIGS. 1A-1F, where an exterior rod engages an exterior feature of the filled container.

Reference is now made to FIG. 3, which illustrates a container 400 formed and filled with product 405 according to the container forming process shown in FIGS. 1A-1F, where an exterior rod 100 can engage an exterior surface 415 of the filled container 400. The container 400 is shown within the mold 300; however, the container 400 can be entirely removed from the mold 300 or a bottom portion 425 of the mold 300 can be removed from a remainder of the mold 300. As shown, the container 400 can be filled with product 405 to substantially the capacity of the container 400, which can account for the first product level 410 in this particular embodiment.

Figure 4:
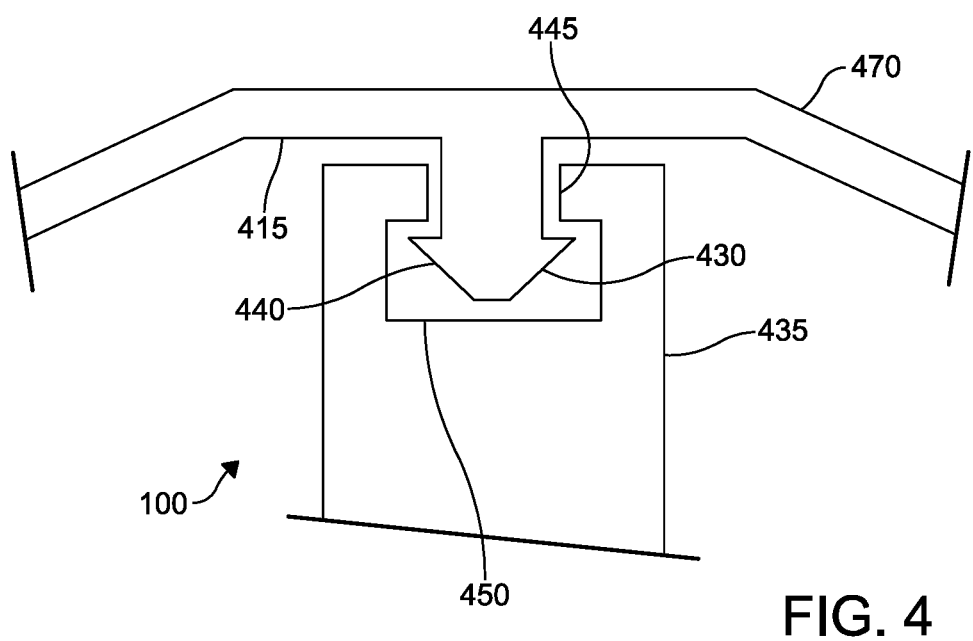
FIG. 4 illustrates a detailed view of the circled inset marked —4— in FIG. 3, where the exterior rod is engaged with the exterior feature of the container.

FIG. 4 illustrates a detailed view of the circled inset marked —4— in FIG. 3, where the exterior rod 100 is shown engaged with an exterior feature 430 on the exterior surface 415 of the container 400. The exterior feature 430 can be configured to be complementary to an end portion 435 of the exterior rod 100. In this way, the end portion 435 of the exterior rod 100 can engage the exterior feature 430 and allow a force to be applied thereto, where the force can also be applied to the exterior surface 415 or transmitted to the exterior surface 415 through the exterior feature 430. The complementarity and engagement of the end portion 435 with the exterior feature 430 can allow various directions of force to be applied to the exterior surface 415 of the container 400. For example, the exterior rod 100 can push on the exterior surface 415 as shown in FIG. 2B. The engagement of the end portion 435 with the exterior feature 430, however, also allows the exterior rod 100 to pull on the exterior feature 430, which transmits the pulling force to the exterior surface 415 of the container 400. In the embodiment depicted, the exterior feature 430 can include a resilient collar 440 that deforms when passing through an aperture 445 in the end portion 435 of the exterior rod 100. The resilient collar 440 springs back to a diameter larger than a diameter of the aperture 445 upon entering a recess 450 in the end portion 435. In certain embodiments, the exterior feature 430 can snap into the end portion 435 of the exterior rod in this fashion. It is understood that other configurations, including various articulating means and complementary engagement means, can be used to couple the exterior feature 430 and the exterior rod 100.

Figure 5A:
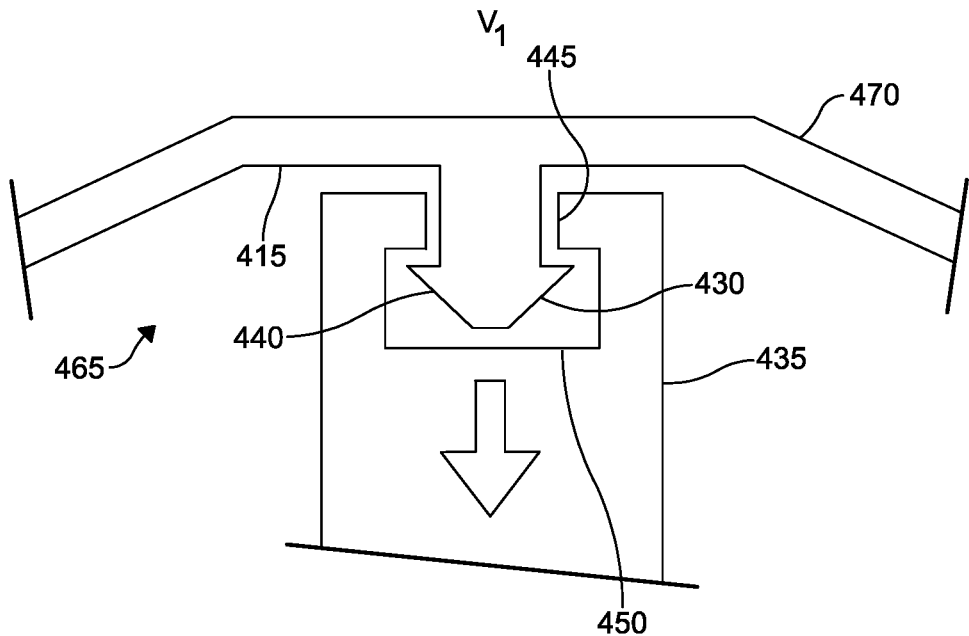
FIGS. 5A-5B illustrate the detailed view of FIG. 4, where the mold and the filled container are at least partially separated, the exterior rod pulls on the exterior feature of the container to change a first volume (5A) to a second volume (5B), thereby adjusting a final product level in the filled container.
Figure 5B:
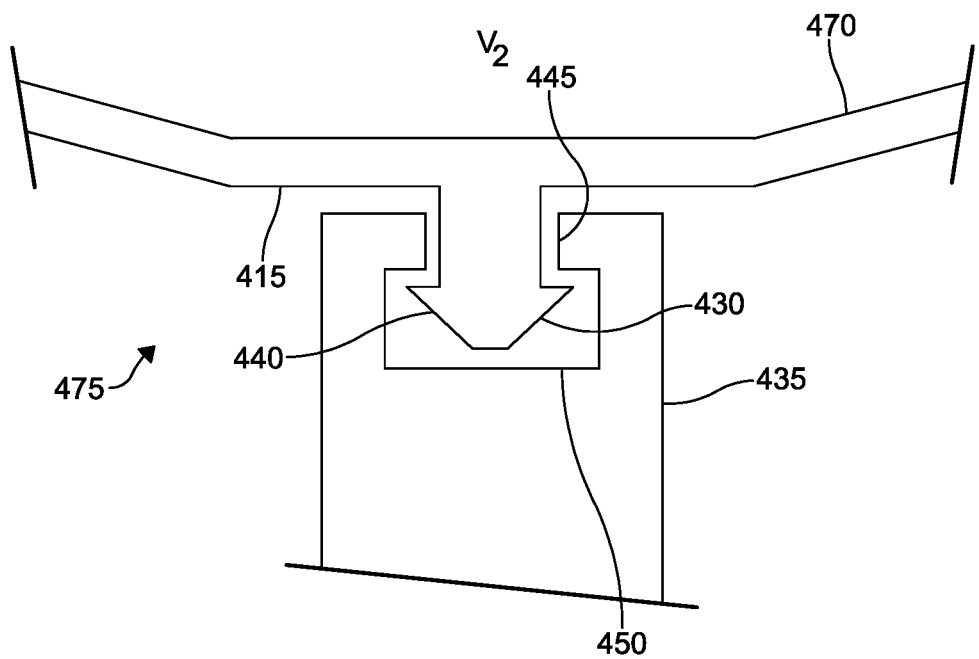

FIGS. 5A-5B illustrate the detailed view of FIG. 4, where at least the bottom portion 425 of the mold 300 is separated from the container 400. The series of views depict how the exterior rod 100 can be used to apply a pulling force on the exterior feature 430 of the container 400 to change a first volume $V_1$ (FIG. 5A) to a second volume $V_2$ (FIG. 5B), thereby adjusting the first product level 410 to a second (final) product level 460 (see FIG. 3) in the filled container 400. As depicted by the arrow in FIG. 5A, the exterior rod 100, engaged with the exterior feature 430, applies a pulling force to the exterior surface 415 of the container 400 that results in the container 400 increasing in volume; i.e., $V_2 > V_1$. The particular embodiment depicted has the exterior feature 430 located within a recess 465 formed in the wall 470 of the container 400. In the particular embodiment shown, the recess 465 is located on the bottom of the container 400. This recess 465 can be inverted when the exterior rod 100 applies the pulling force to the exterior feature 430, where a portion of the wall 470 of the container 400 pops out and remains in such position following cessation of the force. In this way, the container changes from the first volume $V_1$ (FIG. 5A) to the second volume $V_2$ (FIG. 5B) and the product 405 in the container changes from the first product level 410 to the second product level 460. It is also possible to have the portion of the wall 470 partially return to its former recess 465 shape or where the wall 470 forms a substantially planar surface with a remainder of the bottom of the container 400 instead of protruding therefrom. It is also possible to have multiple concentric stepped recesses 465 that can be pulled and inverted in successive stages providing multiple defined second product level 460 options.

As these examples illustrate, the presently described methods and systems can simultaneously form and fill a container and reproducibly and accurately control a final product level in the container. However, it is understood that the present technology can be used in conjunction with other container manufacturing methods, such as for example, extrusion blow molding, one step injection stretch blow molding, and injection blow molding, and can be used with various container materials including, for example, thermoplastic, high density polyethylene, polypropylene, polyethylene naphthalate (PEN), a PET/PEN blend or copolymer, and various multilayer structures may be suitable for the manufacture of plastic containers and used in connection with the principles described herein. While the present disclosure contemplates the production of PET containers, it is understood that other polyolefin materials (e.g., polyethylene, polypropylene, polyester, etc.) as well as a number of other plastics can be processed using the present technology.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A process for controlling a level of a product in a container, the process comprising:
   engaging an exterior surface of the container containing the product at a first product level; and
   applying a force to the exterior surface of the container to cause the container to change from a first volume to a second volume, wherein the first volume is less than the second volume;
   whereupon cessation of the force results in the container containing the product at a second product level, and wherein the container remains at the second volume following cessation of the force.

2. The process of claim 1, wherein the first product level relates to an amount of product substantially equal to the first volume.

3. The process of claim 1, wherein the second product level relates to an amount of product substantially equal to the second volume.

4. The process of claim 1, wherein prior to applying a force to the exterior surface of the container to cause the container to change from a first volume to a second volume, the process further comprises dispensing the product into a preform to form and fill the container with the product.

5. The process of claim 4, wherein at least a portion of the preform is positioned within a mold cavity defining an internal surface, a blow nozzle transfers the product to the preform to urge the preform to expand toward the internal surface of the mold cavity and form the container, where the product remains within the container.

6. The process of claim 5, wherein prior to the blow nozzle transferring the product to the preform to urge the preform to expand toward the internal surface of the mold cavity and form the container, the preform is mechanically stretched within the mold cavity using a stretch rod.

7. The process of claim 6, wherein an exterior rod engages an exterior surface of the preform when the preform is mechanically stretched within the mold cavity using the stretch rod.

8. The process of claim 1, wherein engaging the exterior surface of the container containing the product at the first product level includes engaging an engagement feature on the exterior surface of the container.

9. The process of claim 8, wherein the engagement feature is an injection molded feature of a preform used to form the container.

10. The process of claim 8, wherein the engagement feature includes a projection on the exterior surface of the container.

11. The process of claim 10, wherein the projection is located within a recessed portion of the exterior surface of the container existing prior to applying the force to the exterior surface of the container to cause the container to change from the first volume to the second volume.

12. The process of claim 11, wherein the recessed portion of the exterior surface of the container changes to a projecting portion of the exterior surface of the container following applying the force to the exterior surface of the container to cause the container to change from the first volume to the second volume.

13. The process of claim 10, wherein applying the force to the exterior surface of the container to cause the container to change from the first volume to the second volume includes pulling the projection to cause the first volume to be increased to the second volume.

14. The process of claim 1, further comprising sealing the container containing the product at the second product level.

15. A container having a level of a product prepared by a process according to claim 1.

16. A container having a level of a product prepared by a process according to claim 1.

17. A process for controlling a level of a product in a container, the process comprising:
  engaging a projection on an exterior surface of the container containing the product at a first product level, the projection resulting from one of a sprue in forming the container or from extrusion blow molding of the container; and
  applying a force to the projection to cause the container to change from a first volume to a second volume, wherein the first volume is less than the second volume;
  whereupon cessation of the force results in the container containing the product at a second product level.

18. A process for controlling a level of a product in a container, the process comprising:
  engaging a projection on an exterior surface of the container containing the product at a first product level;
  applying a force to the projection to cause the container to change from a first volume to a second volume, wherein the first volume is less than the second volume, whereupon cessation of the force results in the container containing the product at a second product level; and
  removing the projection from the exterior surface of the container following cessation of the force.

\* \* \* \* \*